US012204143B2

(12) United States Patent
Khan et al.

(10) Patent No.: US 12,204,143 B2
(45) Date of Patent: Jan. 21, 2025

(54) MONOLITHICALLY INTEGRATED WAVEGUIDE SENSORS ON DIAMOND DISPLAY GLASS SYSTEM AND METHOD

(71) Applicant: AKHAN Semiconductor, Inc., Gurnee, IL (US)

(72) Inventors: Adam Khan, Tiburon, CA (US); Kiran Kumar Kovi, Lisle, IL (US); Ernest Schirmann, Lake Zurich, IL (US); William Alberth, Prairie Grove, IL (US)

(73) Assignee: AKHAN SEMICONDUCTOR, INC., Gurnee, IL (US)

(*) Notice: Subject to any disclaimer, the term of this patent is extended or adjusted under 35 U.S.C. 154(b) by 0 days.

(21) Appl. No.: 18/441,699

(22) Filed: Feb. 14, 2024

(65) Prior Publication Data

US 2024/0184040 A1 Jun. 6, 2024

Related U.S. Application Data

(63) Continuation of application No. 18/298,523, filed on Apr. 11, 2023, now Pat. No. 11,921,319, which is a continuation of application No. 17/554,763, filed on Dec. 17, 2021, now Pat. No. 11,656,404.

(60) Provisional application No. 63/131,541, filed on Dec. 29, 2020.

(51) Int. Cl.
*G02B 6/12* (2006.01)
*G02B 6/136* (2006.01)

(52) U.S. Cl.
CPC ........ *G02B 6/12004* (2013.01); *G02B 6/136* (2013.01); *G02B 2006/12038* (2013.01); *G02B 2006/12138* (2013.01)

(58) Field of Classification Search
CPC ............... G02B 6/12004; G02B 6/136; G02B 2006/12038; G02B 2006/12138; H04M 2250/12; H04M 1/026; H04M 1/0266
See application file for complete search history.

(56) References Cited

U.S. PATENT DOCUMENTS

| 5,619,059 | A  | * | 4/1997 | Li ...................... G02B 26/0841 257/431 |
| 5,715,337 | A  | * | 2/1998 | Spitzer ............... G02B 27/0172 385/115 |
| 9,709,504 | B2 | * | 7/2017 | Österlund .......... G01N 21/3577 |
| 10,527,783 | B2 | * | 1/2020 | Badding ............ G02B 6/02395 |
| 10,585,243 | B2 | * | 3/2020 | Bassett .................. G02B 6/136 |
| 11,572,621 | B2 | * | 2/2023 | Khan .................. C23C 16/0227 |
| 11,656,404 | B2 | * | 5/2023 | Khan ..................... G02B 6/136 385/14 |
| 2005/0110978 | A1 | * | 5/2005 | Potyrailo ............. G11B 23/281 |
| 2006/0187608 | A1 | * | 8/2006 | Stark ....................... C03C 27/08 361/202 |

(Continued)

*Primary Examiner* — Andrew Jordan
(74) *Attorney, Agent, or Firm* — David R. Stevens; Stevens Law Group

(57) ABSTRACT

A transparent display includes a display including a transparent substrate and a patterned diamond layer formed on the transparent substrate to at least in part define a diamond waveguide. At least two electronic devices can be connected by the diamond waveguide, and can include a sensor, a transducer, or electronic circuitry, including communication, control, or data processing electronic circuitry.

9 Claims, 3 Drawing Sheets

(56) References Cited

U.S. PATENT DOCUMENTS

| | | | | |
|---|---|---|---|---|
| 2008/0082090 A1* | 4/2008 | Manstein | ............. | A61B 18/203 |
| | | | | 606/9 |
| 2010/0317132 A1* | 12/2010 | Rogers | ................ | H01L 21/6835 |
| | | | | 257/E33.059 |
| 2011/0090484 A1* | 4/2011 | Osterlund | .......... | G01N 21/3577 |
| | | | | 427/163.2 |
| 2012/0299175 A1* | 11/2012 | Tran | ................... | G11C 13/0019 |
| | | | | 257/E23.09 |
| 2013/0107352 A1* | 5/2013 | Santori | ................. | B82Y 10/00 |
| | | | | 359/346 |
| 2016/0201221 A1* | 7/2016 | Misra | ..................... | C30B 25/20 |
| | | | | 117/85 |
| 2017/0336537 A1* | 11/2017 | Khan | ................... | C23C 28/34 |
| 2018/0068850 A1* | 3/2018 | Butler | ............... | H01L 21/02527 |
| 2018/0095220 A1* | 4/2018 | Badding | .................. | C03C 3/32 |
| 2018/0127871 A1* | 5/2018 | Khan | ................... | C23C 16/274 |
| 2018/0252867 A1* | 9/2018 | Nebel | ...................... | G02B 6/13 |
| 2018/0348431 A1* | 12/2018 | Bassett | ................. | G02B 6/132 |
| 2021/0140037 A1* | 5/2021 | Khan | ................... | C30B 25/186 |
| 2022/0206218 A1* | 6/2022 | Khan | ................ | G02B 6/12004 |
| 2023/0062860 A1* | 3/2023 | Dantus | ................ | C30B 25/205 |
| 2023/0151481 A1* | 5/2023 | Khan | ................... | C23C 16/274 |
| | | | | 428/336 |
| 2023/0266527 A1* | 8/2023 | Khan | ................. | H04M 1/0266 |
| 2024/0184040 A1* | 6/2024 | Khan | ................ | G02B 6/12004 |

* cited by examiner

MONOLITHICALLY INTEGRATED WAVEGUIDE SENSORS ON DIAMOND DISPLAY GLASS SYSTEM AND METHOD

RELATED APPLICATION

This application is a continuation of U.S. patent application Ser. No. 18/298,523, filed Apr. 11, 2024, which is a continuation of U.S. patent application Ser. No. 17/554,763, filed on Dec. 17, 2021, which claims the priority benefit of U.S. Provisional Patent Application No. 63/131,541, filed on Dec. 29, 2020, all of which are hereby incorporated by reference in their entirety.

TECHNICAL FIELD

The present disclosure relates generally to the field of materials and coatings that support transparent diamond optoelectronics. More specifically, described are systems and methods for integrating sensors into a multi-layer diamond display system such as can be used in electronic devices.

BACKGROUND

Diamond possesses favorable optical, mechanical, and semiconductor performance characteristics, enabling the possibility of creating transparent electronics and optoelectronics including those related to consumer electronic components and materials such as displays and lens materials. These applications often include stringent design requirements such as increased hardness, scratch resistance, and water resistance. These applications also often require the use of integrated sensing components (e.g., thermal, biological, and chemical). Although diamond is well suited to addressing these stringent design requirements and functionality, practical applications for consumer electronics have been limited due to manufacture costs or process limitations. Materials, structures, and procedures that reduce or eliminate such issues are needed.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION

Figure 1:
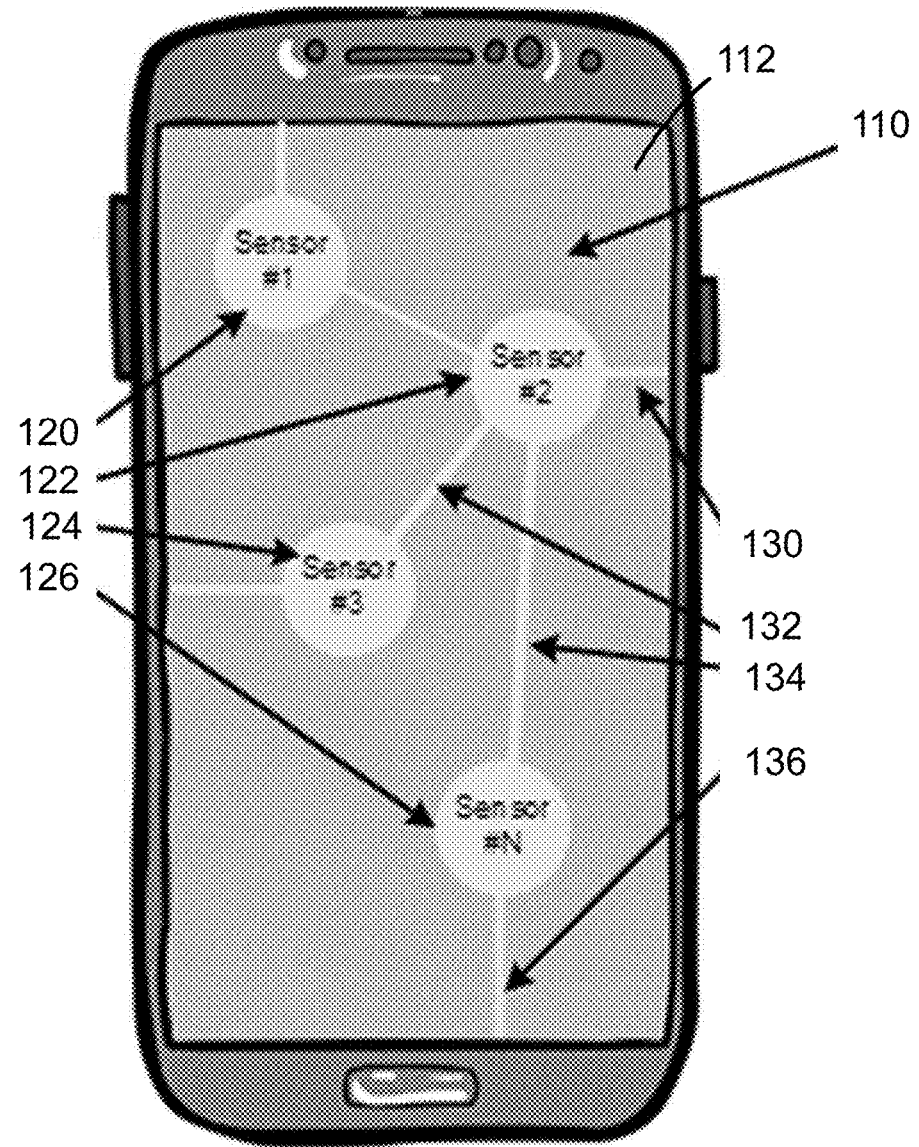
FIG. 1 is a schematic diagram of an exemplary display glass system having integrated optical waveguide structures for integrating sensors.

Consumer and industrial electronics are increasingly incorporating a wide variety of sensors and transducers to enhance the users' experience. As an example, modern mobile telephones often incorporate sensors for temperature (e.g., to protect circuitry), medical (e.g., heart rate), and chemical (e.g., liquids such as water) purposes. Other electronic devices extensively incorporating sensors include but are not limited to virtual reality headsets, protective face shields, heads-up displays, cameras, and televisions. Example environmental sensors and transducers that have or are envisioned to be integrated into mobile phones and other devices can include those responding to visible light, infrared light, temperature, detected chemicals, proximity, or pressure. Example biological sensors can include monitors for heart rate, blood oxygen, blood pressure, fingerprints, galvanic skin response, EEG/EKG, or brain waves. Example electromechanical sensors or transducers can include speakers, microphones, gyroscopes, accelerometers, wireless power, photonic power, or quantum security components.

Many of these sensors and transducers can be embedded in passive or user-interactive displays. Likewise, communication links between sensors, transducers, and external circuitry can be embedded in the displays. To maintain a quality user experience, these sensors, transducers, and communication links between can be made transparent to visible light. Transparent optical waveguides embedded in the display system can and are expected to facilitate these communication links.

Advantageously, diamond has broad optical transmissivity over the visible light spectrum, thus enabling its use as a protective coating on display glasses. Diamond is known to have useful physical properties, such has extreme hardness and thermal conductivity, that can improve display glass scratch resistance and temperature management. Other diamond properties such as hydrophobicity and chemical/biological inertness also make it highly desirable as a protective coating on display glasses. Multilayer combinations of diamond and other materials, including other carbon compounds, can further enhance these properties.

This disclosure describes the use of diamond to enable transparent optical waveguides for integration of sensors and transducers in modern display systems. In this invention, diamond is used as an optical waveguide, a protective coating for a glass optical waveguide, and/or a surface protectant for a display system. Disclosed herein is a new and improved system and method for integrating sensors into diamond coated optically transparent display glass systems. In accordance with one aspect of the approach, an optically transparent display glass system with integrated sensors may include an optically transparent single (e.g., alumino-silicate) or multilayer glass substrate. In one embodiment, polycrystalline diamond, nanocrystalline diamond (i.e. with grain sizes less than about 100 nm), or a combination of polycrystalline and nanocrystalline diamond can be included in a diamond film coating the glass substrate, and in optical waveguides formed in the diamond film coating. In effect, display structures that are low cost, durable, and useful can include at least two electronic devices that are at least one of a sensor, a transducer, or electronic circuitry, including communication, control, or data processing electronic circuitry. The electronic devices can be connected by the diamond waveguide transparent substrate and a patterned diamond layer formed on the transparent substrate to at least in part define a diamond waveguide.

In accordance with another aspect of the approach, a method of fabricating an optically transparent display glass system may include the steps of (1) selecting a single or multilayer glass substrate, (2) cleaning and seeding the substrate, (3) forming a diamond film including polycrystalline and/or nanocrystalline diamond on the glass substrate using a chemical vapor deposition system having a reactor in which methane, hydrogen, and argon source gases are added, (4) patterning optical waveguide structures using semiconductor lithography, and (5) forming optical waveguide structures in the diamond using reactive ion etching.

In another embodiment, a method for forming a transparent display incorporating a waveguide includes providing a transparent substrate and forming a diamond film including polycrystalline and/or nanocrystalline diamond on the transparent substrate. Optical waveguide structures in the diamond film can also include polycrystalline and/or nanocrystalline diamond and can be patterned by etching, with the optical waveguide structures able to interconnect least two electronic devices.

U.S. Pat. Nos. 10,254,445 and 10,224,514 are incorporated by reference and include information on the use and deposition of diamond on glass suitable for use in conjunction with described systems and methods. U.S. patent application Ser. No. 17/031,762 is also incorporated by reference and includes information on the deposition of diamond and fluorinated graphene oxide suitable for use in conjunction with described systems and methods.

Other systems, methods, aspects, features, embodiments, and advantages of the system and method disclosed herein will be, or will become, apparent to one having ordinary skill in the art upon examination of the following drawings and detailed description. It is intended that all such additional systems, methods, aspects, features, embodiments, and advantages be included within this description, and be within the scope of the accompanying claims.

FIG. 1 illustrates an exemplary display glass system 100 having integrated optical waveguide structures for integrating sensors. In this example, the display glass system is integrated into a mobile telephone. The display glass system 100 can include a single or multilayer substrate 110 that includes a diamond layer 112. Optionally, one or more additional layers that enhance the surface properties of the display can be included above or below the diamond layer 112, all layers of which are transparent to visible light. The display glass system 100 may include sensors and transducers 120, 122, 124, and 126 embedded in, on, or beneath the transparent layers of the system. The display glass system 100 can also include transparent optical waveguides 130, 132, 134, and 136 that interconnect the embedded sensors and transducers 120, 122, 124, and 126 and any associated optoelectronic circuitry external to the display system. The substrate, diamond layer 112, and optional enhancement layers may be curved at the edges to facilitate "wraparound" communications via waveguides that follow the contour of the curved surface.

The single or multilayer substrate may be composed of glass, including alumno-silicate (chemically or non-chemically hardened), silicate, soda-lime, borosilicate, germinate, phosphate, fluoride, or chalcogenide glasses, display plastics, or other transparent materials know to those having ordinary skill in the art. Any of the aforementioned materials, as well as combinations thereof, may be included in the substrate layer.

In some embodiments, the diamond layer 112 can include coatings of various diamond, diamond-like, or diamond containing materials and structures. For the purposes of this disclosure, diamond refers to a crystalline structure of carbon atoms bonded to other carbon atoms in a lattice of tetrahedral coordination known as $sp^3$ bonding. Each carbon atom can be surrounded by and bonded to four other carbon atoms, each located on the tip of a regular tetrahedron. In some embodiments the tetrahedral bonding configuration of carbon atoms can be irregular or distorted for at least some volume of the diamond layer 112, or otherwise deviate from the standard tetrahedron configuration of diamond as described above. Such distortion generally results in lengthening of some bonds and shortening of others, as well as the variation of the bond angles between the bonds. In some embodiments, the distortion of the tetrahedron alters the characteristics and properties of the carbon to effectively lie between the characteristics of carbon bonded in $sp^3$ configuration (i.e. diamond) and carbon bonded in $sp^2$ configuration (i.e. graphite). One example of material having carbon atoms bonded in distorted tetrahedral bonding is amorphous diamond. In other diamond film embodiments, diamond-like carbon can be formed as a carbonaceous material having carbon atoms as the majority element, with some amount of such carbon atoms bonded in distorted tetrahedral coordination. Diamond films can include a variety of other elements as impurities or as dopants, including without limitation, hydrogen, sulfur, phosphorous, boron, nitrogen, silicon, or tungsten. This can be useful, for example, in modifying electrical or chemical diamond film properties.

Diamond deposition can be by any process such as, but not limited to, chemical vapor deposition (CVD) and physical vapor deposition (PVD). A wide variety of embodiments of vapor deposition method can be used. Examples of vapor deposition methods include hot filament CVD, rf-CVD, laser CVD (LCVD), laser ablation, conformal diamond coating processes, metal-organic CVD (MOCVD), sputtering, thermal evaporation PVD, ionized metal PVD (IM-PVD), electron beam PVD (EBPVD), reactive PVD, cathodic arc, and the like.

In some embodiments, a thin diamond film can be deposited at relatively low temperatures of less than 570 degrees Celsius using an activation medium like plasma, argon gas and a carbon source, such as methane. In other embodiments, deposition can be at temperatures between 375 and 500 degrees Celsius. Advantageously, as compared to conventional 700-800 degree Celsius temperatures for diamond film growth, such low temperatures greatly reduce thermal warping of a substrate or other applied coatings, or associated electronics or optoelectronics. In other embodiments, the diamond layer 112 can be a thin film polycrystalline diamond deposited at a low temperature to eliminate or minimize degradation of substrate glasses, embedded electronics, or embedded opto-electronics, for example, at temperatures less than 450 degrees Celsius. In one embodiment, the diamond layer may be approximately 500 nm thick to support fabrication of optical waveguides in the layer. In another embodiment, the diamond layer may be approximately 100 nm thick to serve as a surface protectant for the underlying glass layer and optical waveguides fabricated therein.

In some embodiments, deposition gas is ignited and forms small diamonds that grow on a wafer, producing a continuous, thin, and conformal layer. The type and structure of diamond deposited is dependent on the seed method used. Large grain seed can result in microcrystalline diamond with increased hardness. Small grain sizes in nanocrystalline diamond (typically less than 100 nm) can provide lower surface roughness.

Properties of diamond film can be measured and characterized using Raman spectroscopy. Cubic diamond has a single Raman-active first order phonon mode at the center of the Brillouin zone. The presence of sharp Raman lines allows cubic diamond to be recognized against a background of graphitic or other carbon crystal types. Small shifts in the band wavenumber can indicate diamond composition and properties. In some embodiments, the full width half maximum (FWHM) obtained from Raman characterization for the diamond films formed as indicated in this disclosure can be between 5-10.

In some embodiments the diamond film can be conformally deposited over as a continuous layer over the surface. Alternatively, with the use of masking, etching, or suitable growth enhancing or growth reducing techniques, only selected area(s) can be provided with a diamond film. In some embodiments, diamond film thickness can be constant across the surface, while in other embodiments thickness can vary according to position.

In some embodiments, diamond film thickness can be constant across the surface, while in other embodiments thickness can vary according to position. Diamond thickness can be between 10 nanometers to 100 microns. In some embodiments, grain size can be between 200 and 300 microns. In some embodiments, at least 95% of the grains are sized between 200 and 300 microns. In still other embodiments, at least 99% of the grains are sized between 200 and 300 microns.

An additional thin film material (e.g., fluorinated graphene oxide) may be included on the diamond layer to further enhance surface properties (e.g., hydrophobicity) of the display. This additional layer may be a carbon-based compound or other material.

The sensors and transducers 120, 122, 124, and 126 embedded in, on, or beneath the transparent layers of the display system 100 can be fabricated with transparent optoelectronic circuitry. The circuitry may be fabricated in a semiconducting diamond layer 112 with doped regions that modify electrical characteristics. The sensors and transducers 120, 122, 124, and 126 can communicate through optical receive and/or transmit interfaces via the optical waveguide structures embedded in the diamond layer 112 or substrate layers of the display system 100. Interfaces to sensor and transducers 120, 122, 124, and 126 can be used to receive control signals, transmit data, receive power, or facilitate other communication between sensors, transducers, computers, controllers, other circuitry in the device, and external circuitry.

The optical waveguides 130, 132, 134, and 136 can be formed in the thin film diamond coating layer or in the underlying glass layer that is subsequently coated with a protective diamond thin film. The waveguide structures may be rectangular in cross section with, for example, dimensions less than 1 um to facilitate optical communication in the low infrared range. The waveguide structures may follow straight or curve paths. Waveguides may also "wrap around" the curved edges of the display system to facilitate communication to external optoelectronics in the underlying or adjacent. The bend radius of the optical waveguides may be, for example, less and 0.5 mm without causing excessive transmission loss.

Figure 2:
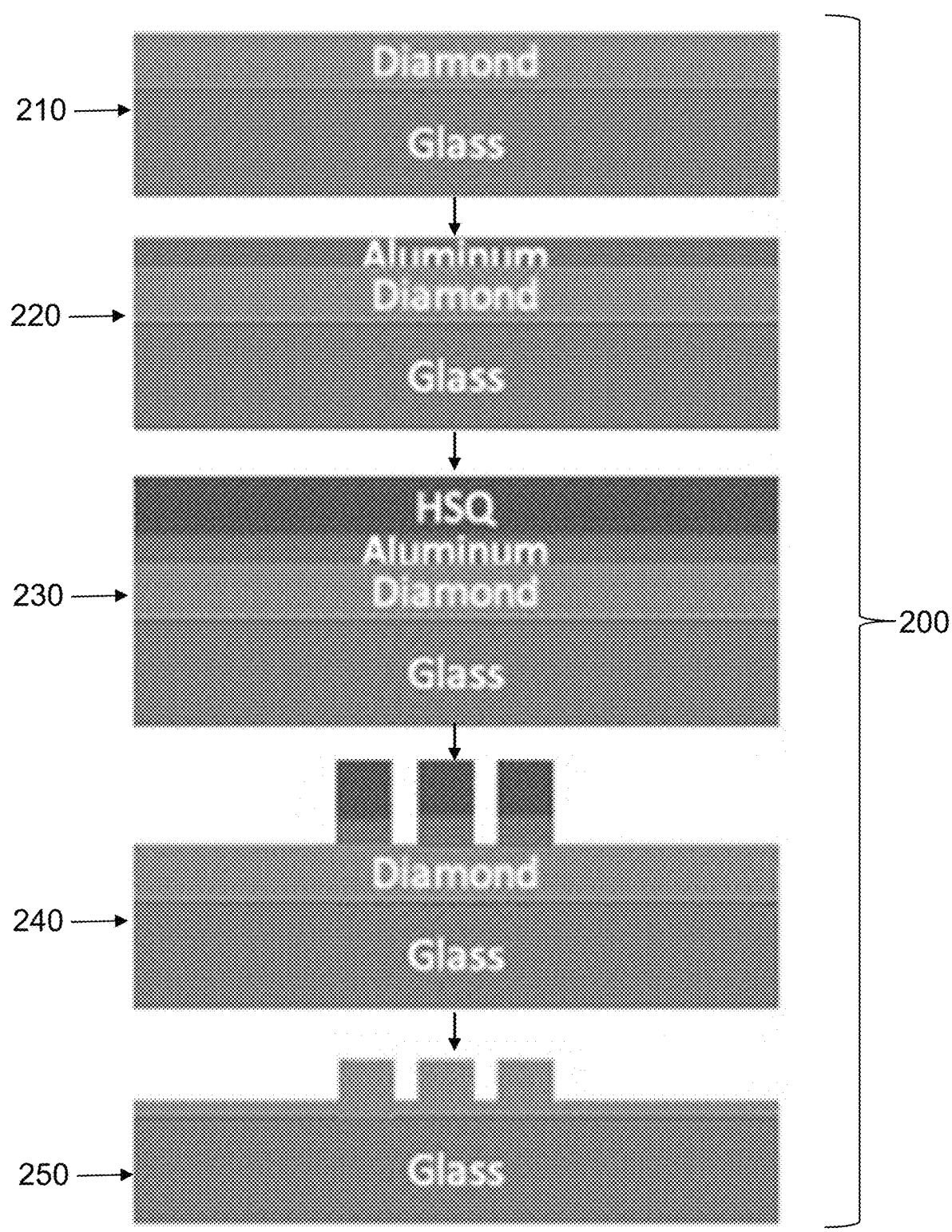
FIG. 2 is an embodiment of a method for fabricating a display glass system having integrated diamond waveguides for integrating sensors.

FIG. 2 illustrates one embodiment of a process 200 for manufacture of a diamond optical waveguides on a glass substrate. The fabrication of the multilayer structure can be realized by utilizing a combination of techniques, such as, chemical vapor deposition (CVD), physical vapor deposition (PVD), lithography which can be e-beam or optical lithography and reactive ion etching (RIE).

The glass substrate can be of any type of glass such as alumino-silicate (chemically hardened and non-chemically hardened), fused silica, silicate glass, soda-lime glass, borosilicate glasses, germanate glasses, phosphate glasses, fluoride glasses, chalcogenide glasses, filter & attenuator glasses, crown & flint glasses, and foldable plastic, based on the application and environment of operation.

The selected glass substrate can be cleaned by exposing to an acid cleaning mixture, such as (4:1 $H_2SO_4/H_2O_2$, 5:1:1 $H_2O/H_2O_2/HCl$) and a buffered oxide etch, to remove surface contaminants and oxides. Furthermore, the substrate is subjected to an alcohol based ultrasonic cleaning. The next step involves seeding the glass substrate with a nanoseed solution mixture and ultrasonication in alcohol solution to promote nucleation and film agglomeration.

To form layer structure 210 of process 200, polycrystalline diamond is grown on glass using hot filament chemical vapor deposition (HF-CVD) or microwave plasma CVD growth process that contains methane, hydrogen, and argon gas mixtures, where the diamond deposition is in the order of a few hundred nanometers per hour. In the event that the diamond growth is beyond the target thickness, reactive ion etching via an argon and oxygen mixture and/or ion milling may produce bulk, planarized, uniform, diamond films. The diamond surface may also be polished to minimize surface roughness and improve transmission of subsequently formed diamond waveguides.

To form layer structure 220 of process 200, allowing fabrication of optical waveguides on diamond, initially a 15 nm layer of Al is deposited by sputtering or evaporation technique. Hydrogen silsesquioxane (HSQ), which is a negative e-beam resist is then spin coated on to the Al layer to form layer structure 230 of process 200. To form layer structure 240 of process 200, e-beam lithography is performed and developed to pattern the optical waveguides. The waveguides can have a width varying between 100 to 700 nm. The HSQ acts as mask for etching the Poly Crystalline Diamond (PCD) using reactive ion etching (RIE) with oxygen and argon plasma. 400 nm PCD is etched in a controlled manner forming the waveguides and ensuring the presence of the remaining 100 nm diamond layer to form a rib waveguide structure. The HSQ and Al layers can be removed using any of the etching techniques, either by plasma etching or wet etching methods (e.g., using buffered oxide etch).

An additional thin film material (e.g., fluorinated graphene oxide) may be included on the diamond layer to further enhance surface properties (e.g., hydrophobicity) of the display. This additional layer may be a carbon-based compound or other material. The methodology for deposition of this layer can be found in U.S. patent application Ser. No. 17/031,762 previously incorporated by reference and which includes information on the deposition of diamond and fluorinated graphene oxide suitable for use in conjunction with described systems and methods.

In some embodiments, the entire multilayer glass, diamond, diamond waveguide, and FGO structure may subjected to a thermal bending process to form, for example, a waterfall-style screen with an approximately 88 degree bend angle.

Figure 3:
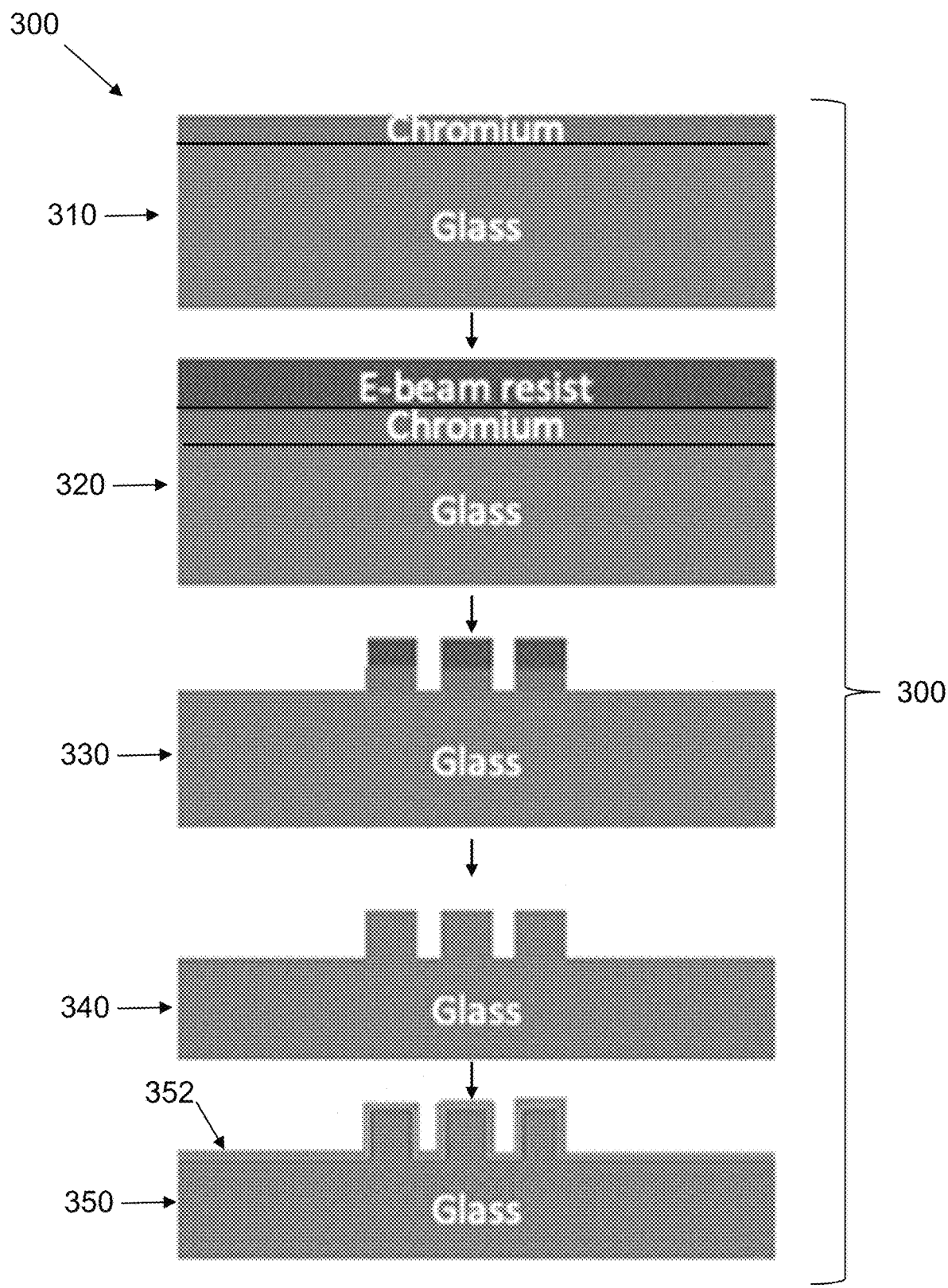
FIG. 3 is an embodiment of a method for fabricating a display glass system having optical waveguides with polycrystalline and/or nanocrystalline diamond coating.

FIG. 3 illustrates one embodiment of a process 300 for manufacture of a diamond optical waveguides. The fabrication of the multilayer structure can be realized by utilizing a combination of techniques, such as, chemical vapor deposition (CVD), physical vapor deposition (PVD), lithography which can be e-beam or optical lithography and reactive ion etching (RIE).

The glass substrate can be of any type of glass such as alumino-silicate (chemically hardened and non-chemically hardened), fused silica, silicate glass, soda-lime glass, borosilicate glasses, germanate glasses, phosphate glasses, fluoride glasses, chalcogenide glasses, filter & attenuator glasses, crown & flint glasses, and foldable plastic, based on the application and environment of operation.

Process 300 can involve exposing a selected substrate to an acid cleaning mixture, such (4:1 $H_2SO_4/H_2O_2$, 5:1:1 $H_2O/H_2O_2/HCl$) and a buffered oxide etch, to remove surface contaminants and oxides. Furthermore, the substrate is subjected to an alcohol based ultrasonic cleaning.

To form layer structure 310 of process 300 useful for fabrication of optical waveguides on glass, initially a 50 nm layer of Cr is deposited by sputtering or evaporation technique to act as mask for pattering the waveguides. To form layer structure 320 of process 300, hydrogen silsesquioxane (HSQ) or similar negative e-beam resist is then spin coated on to the Cr layer. To form layer structure 330 of process 300, lithography, such as E-beam lithography, is performed and developed to pattern the optical waveguides. The waveguides have a width varying between 100 to 700 nm. The Cr acts as mask for etching the glass using reactive ion etching (RIE) with CF4/CHF3 plasma. 400 nm of glass is etched in a controlled manner forming the waveguides forming a rib waveguide structure. To form layer structure 340 of process 300, the residual HSQ and Cr layers can be removed using any of the etching techniques, either by plasma etching or wet etching methods (e.g., using buffered oxide etch).

To form layer structure 350 of process 300, a next step involves seeding the substrate with a nanoseed solution mixture and ultrasonication in alcohol solution to promote nucleation and film agglomeration. Polycrystalline diamond 352 is grown on glass using hot filament chemical vapor deposition (HF-CVD) or microwave plasma CVD growth process that contains methane, hydrogen, and argon gas mixtures, where the diamond deposition is in the order of a few hundred nanometers per hour.

An additional thin film material (e.g., fluorinated graphene oxide) may be included on the diamond layer to further enhance surface properties (e.g., hydrophobicity) of the display. This additional layer may be a carbon-based compound or other material. The methodology for deposition of this layer can be found in U.S. patent application Ser. No. 17/031,762 previously incorporated by reference and which includes information on the deposition of diamond and fluorinated graphene oxide suitable for use in conjunction with described systems and methods.

In some embodiments, the entire multilayer glass, diamond, diamond waveguide, and FGO structure may subjected to a thermal bending process to form, for example, a waterfall-style screen with an approximately 88 degree bend angle.

In the foregoing description, reference is made to the accompanying drawings that form a part thereof, and in which is shown by way of illustration specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the scope of the present disclosure. The foregoing detailed description is, therefore, not to be taken in a limiting sense.

Reference throughout this specification to "one embodiment," "an embodiment," "one example," or "an example" means that a particular feature, structure, or characteristic described in connection with the embodiment or example is included in at least one embodiment of the present disclosure. Thus, appearances of the phrases "in one embodiment," "in an embodiment," "one example," or "an example" in various places throughout this specification are not necessarily all referring to the same embodiment or example. Furthermore, the particular features, structures, databases, or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims. It is also understood that other embodiments of this invention may be practiced in the absence of an element/step not specifically disclosed herein.

The invention claimed is:

1. An optoelectronics structure, comprising:
   a transparent substrate and a patterned diamond layer formed on the transparent substrate to at least in part define a diamond waveguide connectable to at least one electronic device.

2. The optoelectronics structure of claim 1, wherein the at least one electronic device is at least one of a sensor, a transducer, or electronic circuitry, including communication, control, or data processing electronic circuitry.

3. The optoelectronics structure of claim 1, wherein the transparent substrate is a glass.

4. The optoelectronics structure of claim 1, wherein the patterned diamond layer is formed at temperatures of less than 570 degrees Celsius.

5. The optoelectronics structure of claim 1, wherein the patterned diamond layer is formed to continuously cover the transparent substrate.

6. The optoelectronics structure of claim 1, wherein the patterned diamond layer has a thickness of less than 500 microns.

7. The optoelectronics structure of claim 1, wherein the transparent substrate is bent at an angle.

8. The optoelectronics structure of claim 1, wherein the patterned diamond layer further comprises a graphene containing coating.

9. The optoelectronics structure of claim 1, wherein the patterned diamond layer further comprises a graphene containing coating of fluorinated graphene oxide.

* * * * *